US009319422B2

(12) United States Patent
Basil et al.

(10) Patent No.: US 9,319,422 B2
(45) Date of Patent: Apr. 19, 2016

(54) DETECTING REMOTE OPERATION OF A COMPUTER

(71) Applicant: International Business Machines Corporation, Armonk, NY (US)

(72) Inventors: Zohar Basil, Rehovot (IL); Shahar T. Kohanim, Rehovot (IN); Shmulik Regev, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/230,436

(22) Filed: Mar. 31, 2014

(65) Prior Publication Data

US 2015/0281266 A1    Oct. 1, 2015

(51) Int. Cl.
*H04L 29/06* (2006.01)
*H04L 12/26* (2006.01)

(52) U.S. Cl.
CPC ........ *H04L 63/1416* (2013.01); *H04L 43/0876* (2013.01)

(58) Field of Classification Search
CPC .................................................. H04L 63/1416
See application file for complete search history.

(56) References Cited

U.S. PATENT DOCUMENTS

| 7,102,617 | B2* | 9/2006 | Gust .............................. 345/158 |
| 2013/0261770 | A1* | 10/2013 | Iwakawa ................ G05B 11/01 700/13 |
| 2013/0346387 | A1* | 12/2013 | Ayoub .............. G06F 17/30867 707/709 |
| 2014/0372594 | A1* | 12/2014 | Brinza .................... H04L 43/08 709/224 |
| 2015/0095145 | A1* | 4/2015 | Shulman et al. ........... 705/14.53 |

* cited by examiner

*Primary Examiner* — Shawnchoy Rahman
(74) *Attorney, Agent, or Firm* — John H. Sosa

(57) ABSTRACT

Detecting remote operation of a computer by another computer by receiving pointing device movement event information associated with multiple pointing device movement events in a sequence of pointing device movement events detected at a first computer, determining a frequency of the pointing device movement events from the pointing device movement event information, and determining that the frequency is consistent with a frequency of pointing device movement events that are sent to the first computer, thereby detecting that the first computer is operated by a computer other than the first computer.

16 Claims, 5 Drawing Sheets

DETECTING REMOTE OPERATION OF A COMPUTER

FIELD OF THE INVENTION

The present invention relates generally to detection of third party activity, and more particularly, to detection of remote operation of a computer, directed by another computer.

BACKGROUND OF THE INVENTION

In addition to a user directing action on a computer through local input/output devices proximately located to the computer, a computer may also be accessed and operated remotely. In such remote operation, a user does not have physical access to the computer, but can access, manipulate, and control operation of the computer from another computer via a computer network.

SUMMARY

In one embodiment of the invention a method is provided for detecting remote operation of a computer, the method including receiving pointing device movement event information associated with multiple pointing device movement events in a sequence of pointing device movement events detected at a first computer, determining a frequency of the pointing device movement events from the pointing device movement event information, and determining that the frequency is inconsistent with a frequency of pointing device movement events that are originated at the first computer.

In other embodiments of the invention, systems and computer program products embodying the invention are provided.

DETAILED DESCRIPTION

Figure 1:
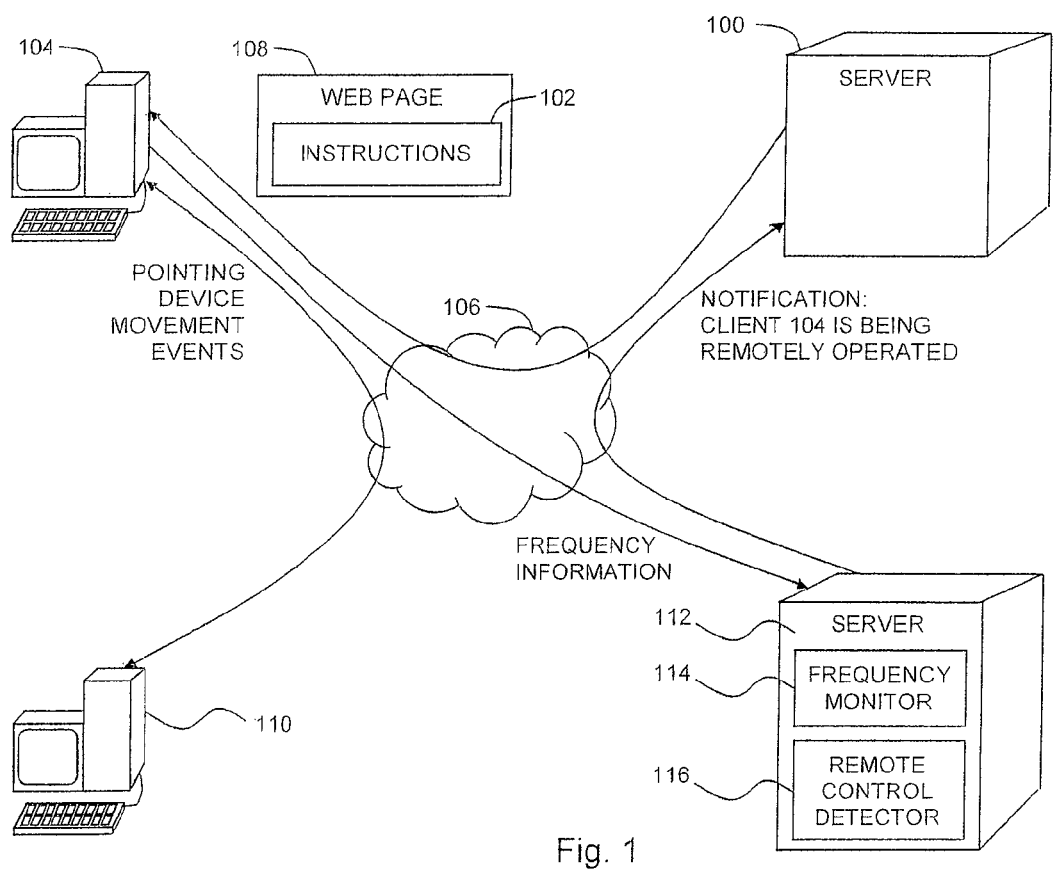
FIG. 1 is a simplified conceptual illustration of a system for detecting remote operation of a computer, constructed and operative in accordance with an embodiment of the invention.

Embodiments of the present invention recognize that fraudulent use of computer network-based financial applications, such as online banking applications, frequently involves a perpetrator remotely operating a victim's computer from another computer and performing a financial transaction using the victim's web browser software while posing as the victim, so as to defeat security controls that require such transactions to be performed at the victim's computer. Embodiments of the present invention allow a computer being accesses by a client, to detect and monitor pointing device movement events on the client and make determinations as to whether the client is being operated remotely. Such embodiments allow the computer to make intelligent decisions with regard to access and security measures. Implementation of embodiments of the invention may take a variety forms, and exemplary implementation details are discussed subsequently with reference to the Figures.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for detecting operation of a computer by another computer, constructed and operative in accordance with an embodiment of the invention. In the system of FIG. 1, a computer 100, hereinafter referred to as server 100, is configured to provide executable computer software instructions 102, hereinafter referred to as instructions 102, to a computer 104, hereinafter referred to as client 104, such as via a computer network 106, such as the Internet.

Server 100 may, for example, provide instructions 102 in the form of JavaScript™ instructions that are embedded within a web page 108 that server 100 provides to client 104 as part of a financial transaction, where client 104 is configured to execute instructions 102 in accordance with conventional techniques.

Instructions 102 are configured to detect pointing device movement events that originate at client 104, such as in response to a computer user providing input to client 104 via a mouse or other pointing device that is physically connected to client 104 or that is in proximate, wireless communication with client 104, such as using WiFi™ or Bluetooth™ communications protocols.

Instructions 102 are also configured to detect pointing device movement events that originate at a computer other than client 104, such as at a computer 110, hereinafter referred to as remote computer 110, that sends pointing device movement events to client 104, such as via computer network 106. For example, a computer user may use remote computer 110 to remotely operate client 104 by using remote desktop software that uses the Remote Desktop Protocol (RDP) or any other suitable protocol intended to enable a computer to remotely operate another computer, such as Remote Desktop Services, commercially available from Microsoft Corporation, Redmond, Wash., or variants of Virtual Network Computing (VNC), commercially available from various vendors. The computer user then uses the remote desktop software to send pointing device movement events from remote computer 110 to client 104, whereupon the pointing device movement events are detected by instructions 102 during their execution at client 104.

Instructions 102 are also configured to report pointing device movement event information associated with pointing device movement events that are detected as described above, and preferably where the pointing device movement event information is associated with a sequence of the pointing device movement events, such as by reporting the pointing device movement event information as described herein below to a server 112, or alternatively to server 100, where in the latter case references to server 112 herein below may be understood as referring to server 100. Instructions 102 are configured to compile the pointing device movement event information using timestamps of the pointing device movement events indicating the time when each such event is detected, where the reported pointing device movement event information includes the pointing device coordinates for each event, as well as the timestamp of the event and/or the time that elapsed from the previous event. For example, the following sample JavaScript™ source code is configured to detect pointing device movement events as described hereinabove:

```
function mouse( ) {
   var trapurl = [get_script_path(current_script_path),mousetrap_url].
   join("/"),
   last_event = start_time,
   request_counter = 0;
   function handler(event) {
      try {
         var x = event.clientX;
         var y = event.clientY;
         if (x==lastx && y==lasty) {
      return;
      }
         var now = new Date( ).getTime( ),
         diff = now − last_event;
      movements.push([x,y,diff]);
      if ( request_counter<mousesend_count &&
   movements.length>=mouse_max_length ) {
         mouse_max_length = Math.min(mouse_max_length*2,200);
         ++request_counter;
         send_request(trapurl,{u: movements.join(";"), i:sid,
```

-continued

```
        y: get_random_cookie( ), q: request_counter});
            movements = [ ];
        }
        last_event = now;
            lastx = x;
            lasty = y;
    } catch(e) {
    }
    return true;
    }
    bind_event(par.document,"mousemove",handler);
}
```

Instructions 102 may optionally be configured to perform any of the operations described herein below and provide their results as part of the pointing device movement event information.

A frequency determiner 114, which may be hosted by server 112, receives the pointing device movement event information reported by client 104. Frequency determiner 114 is configured to determine the frequency of the pointing device movement events using the reported pointing device movement event information.

A remote control detector 116, which may also be hosted by server 112, is configured to determine that client 104 is operated by a computer other than client 104 by determining that the frequency of the pointing device movement events, as provided by frequency determiner 114 to remote control detector 116, is consistent with a frequency of pointing device movement events that are sent to a computer where the pointing device movement events are detected, i.e., from another computer, and/or by determining that the frequency of the pointing device movement events is inconsistent with a frequency of pointing device movement events that originate at a computer where the pointing device movement events are detected.

Figure 3A:
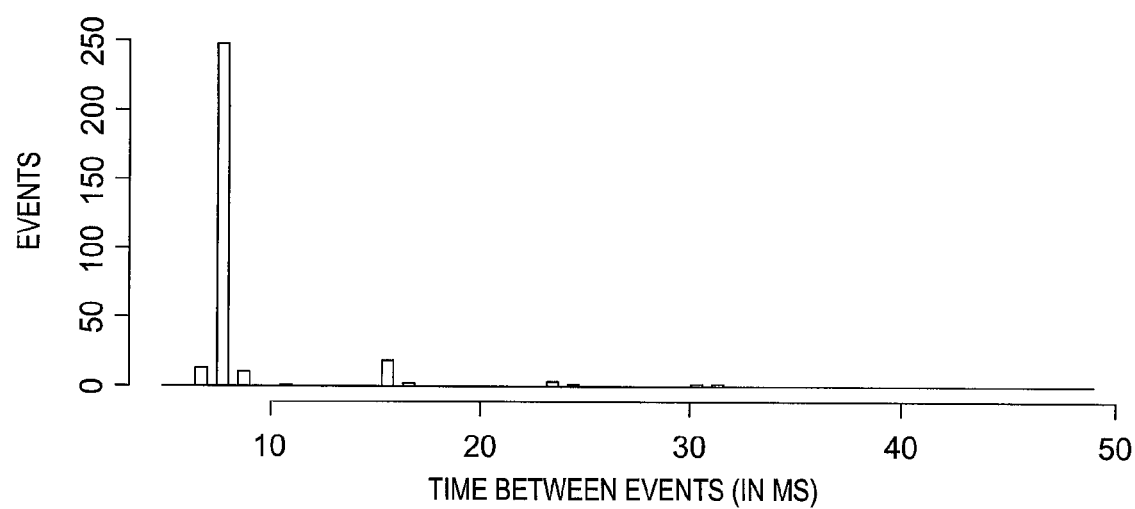
FIGS. 3A-3B are histograms showing the results of experiments relating to detecting pointing device movement events.
Figure 3B:
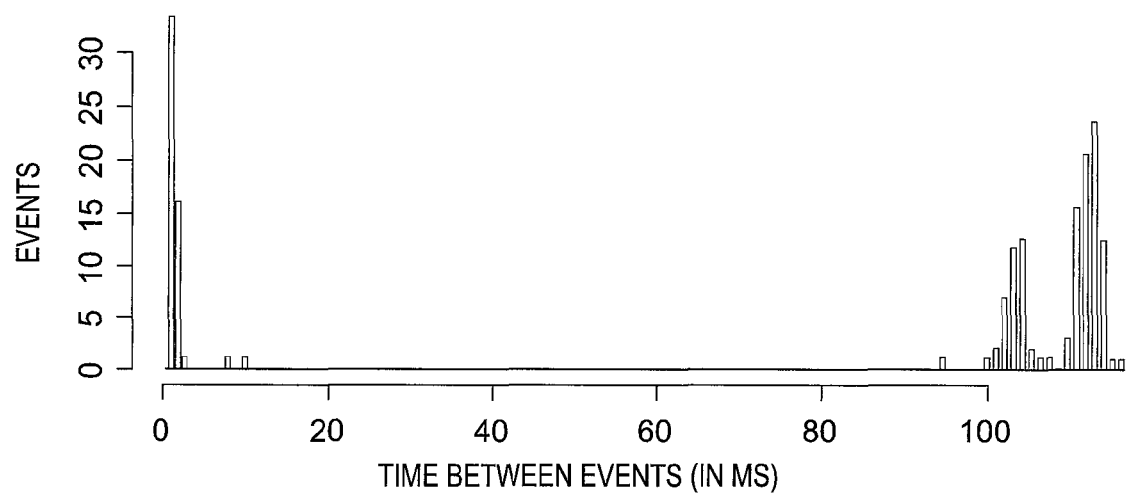

For example, experimentation has shown that a client computer running the Microsoft Windows® operating system generates pointing device movement events with a frequency of approximately 8 ms on average between the events when a computer user provides input to the client computer using a mouse or other pointing device that is physically connected to the client computer or that is in proximate, wireless communication with the client computer, as is represented by the histogram shown in FIG. 3A. Experimentation has also shown that when the client computer receives pointing device movement events that originate at a remote computer that at least partially operates the client computer using the RDP protocol, the pointing device movement events are received by the client computer with a frequency of approximately 100 ms or more on average between the events, as is represented by the histogram shown in FIG. 3B. Remote control detector 116 may thus be configured to determine that client 104 is operated by a computer other than client 104 by determining that the frequency of the pointing device movement events indicates a frequency of pointing device movement events that is approximately 100 ms or more on average between the events or within a predefined deviation therefrom, or by determining that the frequency of the pointing device movement events indicates a frequency of pointing device movement events that exceeds the 8 ms average, such as by a predefined amount.

Remote control detector 116 is also preferably configured to provide a notification, such as to server 100, identifying client 104 as being operated by a computer other than client 104, such as by providing the network address of client 104 in the notification, a session identifier that is associated with client 104, or any other type of information that may be used to identify client 104. Thus, for example, where server 100 provides instructions 102 within web page 108 to client 104 in connection with a financial transaction, such as a banking transaction, and remote control detector 116 determines that client 104 is operated by a computer other than client 104, remote control detector 116 preferably notifies server 100 that client 104 is operated by a computer other than client 104, whereupon server 100 may subject the transaction to additional security measures, such as subjecting the transaction to further scrutiny, curtailing the transaction, or preventing the transaction from being completed.

Figure 2:
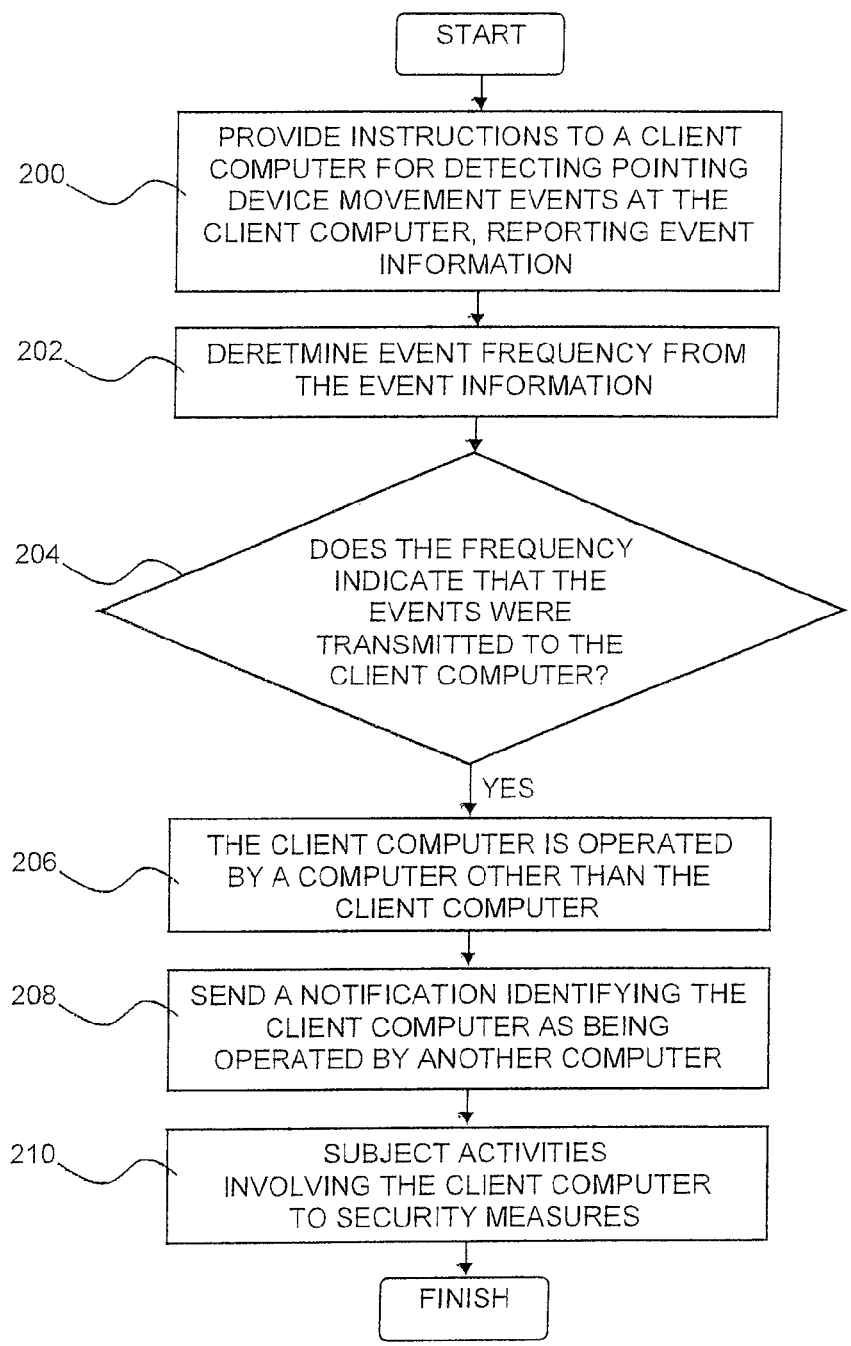
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, executable computer software instructions are provided to a client computer, where the instructions are configured as described hereinabove to detect pointing device movement events that originate at the client computer or at a computer other than the client computer, as well as to report pointing device movement event information associated with the events (step 200), from which information the frequency of the pointing device movement events is determined (step 202). If the pointing device movement event frequency is consistent with a frequency of pointing device movement events that are sent to a computer where the pointing device movement events are detected, i.e., from another computer, and/or is inconsistent with a frequency of pointing device movement events that originate at a computer where the pointing device movement events are detected (step 204), then the client computer is identified as being operated by a computer other than the client computer (step 206), whereupon a notification may be sent identifying the client computer as being operated by another computer (step 208), and activities that involve the client computer may be subject to additional security measures, such as by subjecting the activities to further scrutiny, curtailing the activities, or preventing the activities from being completed (step 210).

The system of FIG. 1 and method of FIG. 2 may be illustrated in the context of the following exemplary scenario in which:

a computer user configures remote computer 110 with remote desktop software and, using the remote desktop software, establishes a remote desktop session with client 104 using conventional techniques;

the computer user at remote computer 110 uses the remote desktop software to cause web browser software at client 104 to navigate to an online banking web site that is hosted by server 100;

server 100 provides web page 108 to the web browser at client 104, where web page 108 includes instructions 102 configured as described hereinabove;

the web browser at client 104 executes instructions 102 and begins detecting pointing device movement events;

the computer user at remote computer 110 attempts to perform a financial transaction at the online banking web site via client 104 by providing input to remote computer 110 via a mouse or other pointing device that is physically connected to, or in proximate, wireless communication with, remote computer 110;

the remote desktop software sends pointing device movement events from remote computer 110 to client 104, where the pointing device movement events represent the input provided by the computer user to remote computer 110;

the web browser at client 104 detects the pointing device movement events received from remote computer 110 and compiles pointing device movement event information associated with the events;

the web browser at client 104 reports the pointing device movement event information to frequency determiner 114 which determines the frequency of the pointing device movement events, whereupon remote computer detector 116 determines that the pointing device movement event frequency is consistent with a frequency of pointing device movement events that are sent to a computer where the pointing device movement events are detected, i.e., from another computer, and therefore determines that client 104 is controlled by another computer;

remote computer detector 116 notifies server 100 that client 104 is being controlled by another computer; and server 100 prevents the financial transaction involving client 104 from being completed.

Figure 4:
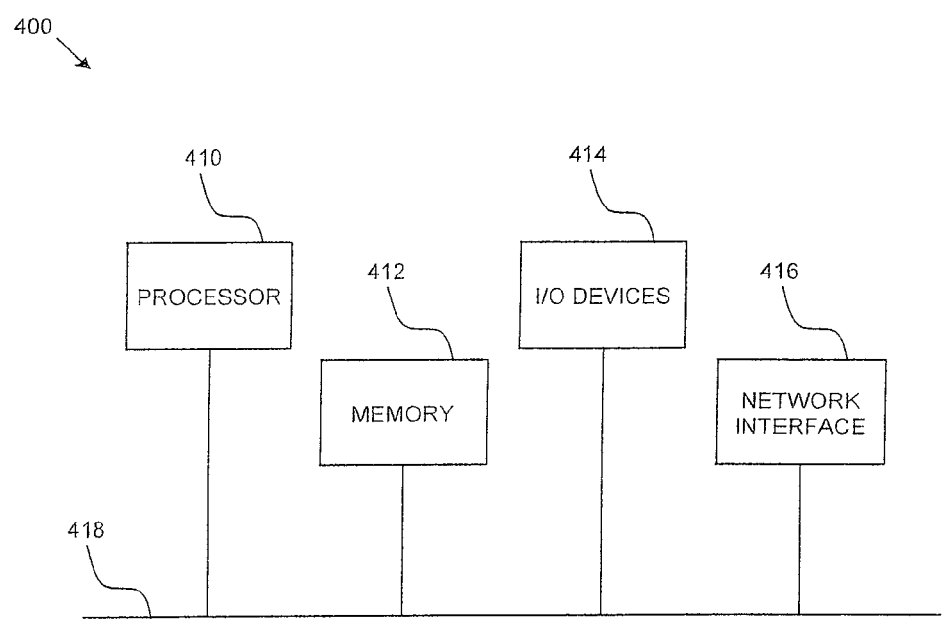
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting remote operation of a computer, the method comprising:

a computer system receiving communication from a separate computer, the communication including at least one of the following:

a request for one or more computer resources from the computer system; and a request for access to one or more computer resources from the computer system;

in response, the computer system sending to the separate computer a webpage containing executable computer software instructions, which when executed are capable of, at least, detecting a plurality of pointing device movement events in a sequence of pointing device movement events at the separate computer;

based on a frequency of the detected pointing device movement events, where frequencies of pointing device movement events controlled by proximately located movement devices are distinguishable from frequencies of pointing device movement events controlled by remotely located moving devices, the computer system instituting at least one additional security measure if the frequency of the detected pointing device movement events is inconsistent with a frequency of pointing device movement events caused by a movement device proximately located to the separate computer.

2. The method of claim 1, wherein the executable computer software instructions are further configured to compile the detected pointing device movement event information using timestamps of the plurality of the pointing device movement events in the sequence of the pointing device movement events.

3. The method of claim 2, wherein the executable computer software instructions are further configured to determine a frequency of timestamps corresponding to the plurality of pointing device movement events.

4. The method of claim 1, further comprising, prior to instituting the at least one additional security measure, the computer system receiving the frequency of the detected plurality of pointing device movement events from the separate computer.

5. The method of claim 1, further comprising:

prior to instituting at least one additional security measure, the computer system receiving information corresponding to the detected plurality of pointing device movement events; and based the received information, the computer system determining the frequency of the detected plurality of pointing device movement events.

6. The method of claim 1, further comprising:

prior to instituting at least one additional security measure, a third computer receiving information corresponding to the detected plurality of pointing device movement events;

the second computer determining the frequency of the detected plurality of pointing device movement events; and the second computer notifying the computer system of the frequency.

7. A computer system for detecting remote operation of a computer, the computer system comprising:

one or more computer processors;

one or more computer readable storage media;

program instructions stored on the one or more computer readable storage media for execution by at least one of the one or more computer processors, the program instructions comprising:

program instructions to receive communication from a separate computer, the communication including at least one of the following:

a request for one or more computer resources from the computer system; and a request for access to one or more computer resources from the computer system;

program instruction to, in response to the computer system receiving the request, send to the separate computer a webpage containing executable computer software instructions, which when executed are capable of, at least, detecting a plurality of pointing device movement events in a sequence of pointing device movement events at the separate computer;

program instructions to, based on a frequency of the detected pointing device movement events, where frequencies of pointing device movement events controlled by proximately located movement devices are distinguishable from frequencies of pointing device movement events controlled by remotely located moving devices, institute at least one additional security measure if the frequency of the detected pointing device movement events is inconsistent with a frequency of pointing device movement events caused by a movement device proximately located to the separate computer.

8. The computer system of claim 7, wherein the executable computer software instructions are further configured to compile the detected pointing device movement event information using timestamps of the plurality of the pointing device movement events in the sequence of the pointing device movement events.

9. The computer system of claim 8, wherein the executable computer software instructions are further configured to determine a frequency of timestamps corresponding to the plurality of pointing device movement events.

10. The computer system of claim 7, further comprising, program instructions to, prior to instituting the at least one additional security measure, receive the frequency of the detected plurality of pointing device movement events.

11. The computer system of claim 7, further comprising:
program instructions to, prior to instituting at least one additional security measure, receive information corresponding to the detected plurality of pointing device movement events; and
program instructions to, based the received information, determine the frequency of the detected plurality of pointing device movement events.

12. A computer program product for detecting remote operation of a computer, the computer program product comprising:
one or more computer readable storage media;
program instructions stored on the one or more computer readable storage media, the program instructions comprising:
program instructions to receive communication from a separate computer, the communication including at least one of the following:
a request for one or more computer resources from the computer system; and
a request for access to one or more computer resources from the computer system;
program instruction to, in response to the computer system receiving the request, send to the separate computer a webpage containing executable computer software instructions, which when executed are capable of, at least, detecting a plurality of pointing device movement events in a sequence of pointing device movement events at the separate computer;
program instructions to, based on a frequency of the detected pointing device movement events, where frequencies of pointing device movement events controlled by proximately located movement devices are distinguishable from frequencies of pointing device movement events controlled by remotely located moving devices, institute at least one additional security measure if the frequency of the detected pointing device movement events is inconsistent with a frequency of pointing device movement events caused by a movement device proximately located to the separate computer.

13. The computer program product of claim 12, wherein the executable computer software instructions are further configured to compile the detected pointing device movement event information using timestamps of the plurality of the pointing device movement events in the sequence of the pointing device movement events.

14. The computer program product of claim 13, wherein the executable computer software instructions are further configured to determine a frequency of timestamps corresponding to the plurality of pointing device movement events.

15. The computer program product of claim 12, further comprising, program instructions to, prior to instituting the at least one additional security measure, receive the frequency of the detected plurality of pointing device movement events.

16. The computer program product of claim 12, further comprising:
program instructions to, prior to instituting at least one additional security measure, receive information corresponding to the detected plurality of pointing device movement events; and
program instructions to, based the received information, determine the frequency of the detected plurality of pointing device movement events.

* * * * *